United States Patent
Azrielant et al.

(10) Patent No.: US 12,445,438 B2
(45) Date of Patent: Oct. 14, 2025

(54) TECHNIQUES FOR MANAGING COOKIES THROUGH A SECURE WEB GATEWAY

(71) Applicant: HEWLETT PACKARD ENTERPRISE DEVELOPMENT LP, Spring, TX (US)

(72) Inventors: Gil Azrielant, Tel Aviv (IL); Guy Sviry, Tel Aviv (IL); Yehoshua Haim Chen, Tel Aviv (IL); Shay Farhuma Gutman, Tel-Aviv (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 153 days.

(21) Appl. No.: 18/359,549

(22) Filed: Jul. 26, 2023

(65) Prior Publication Data

US 2025/0039173 A1  Jan. 30, 2025

(51) Int. Cl.
*G06F 7/04* (2006.01)
*H04L 9/40* (2022.01)

(52) U.S. Cl.
CPC ...... *H04L 63/0876* (2013.01); *H04L 63/0236* (2013.01); *H04L 63/0435* (2013.01)

(58) Field of Classification Search
CPC ............. H04L 63/0876; H04L 63/0236; H04L 63/0435; H04L 9/0819
See application file for complete search history.

(56) References Cited

U.S. PATENT DOCUMENTS

| | | | |
|---|---|---|---|
| 7,779,103 B1 * | 8/2010 | Fikes | G06F 21/6263 709/227 |
| 11,240,242 B1 | 2/2022 | Celik | |
| 11,470,100 B1 | 10/2022 | Christian | |
| 12,155,667 B2 | 11/2024 | Sviry et al. | |
| 2015/0058493 A1 * | 2/2015 | Adams | H04L 63/1475 709/228 |
| 2019/0141015 A1 | 5/2019 | Nellen | |
| 2020/0236112 A1 | 7/2020 | Pularikkal et al. | |
| 2020/0336466 A1 | 10/2020 | Goldschlag et al. | |
| 2021/0218747 A1 | 7/2021 | Azrielant et al. | |
| 2022/0075889 A1 | 3/2022 | Friedman | |

(Continued)

OTHER PUBLICATIONS

Blundo et al, A Lightweight Approach to Authenticated Web Caching, IEEE, Feb. 4, 2005, pp. 1-7. (Year: 2005).*

(Continued)

*Primary Examiner* — Philip J Chea
*Assistant Examiner* — Jenise E Jackson
(74) *Attorney, Agent, or Firm* — Hewlett Packard Enterprise Patent Department

(57) ABSTRACT

A system and method for facilitating communication between a user device and a web application through a zero trust network providing a secure web gateway using authentication cookies. The method includes receiving network traffic from a user device including an altered authentication cookie, the network traffic directed at a web application; retrieving an original authentication cookie based on the altered authentication cookie; generating a new network traffic based on: the received network traffic, and the original authentication cookie; and sending the new network traffic from the zero trust network environment to the web application.

17 Claims, 5 Drawing Sheets

(56) References Cited

U.S. PATENT DOCUMENTS

| | | | |
|---|---|---|---|
| 2023/0123781 A1* | 4/2023 | Kaimal | H04L 41/0893 |
| | | | 726/12 |
| 2023/0216685 A1* | 7/2023 | Kaimal | G06F 21/57 |
| | | | 713/168 |
| 2023/0224167 A1 | 7/2023 | Wang et al. | |
| 2023/0224303 A1 | 7/2023 | Sviri et al. | |

OTHER PUBLICATIONS

Bugliesi et al, Provably Sound Browser-Based Enforcement of Web Session Integrity, IEEE, Jul. 22, 2014, pp. 366-380. (Year: 2014).*
Kwon et al., (In-) Security of Cookies in HTTPS: Cookie Theft by Removing Cookie Flags, Aug. 29, 2019, IEEE, pp. 1204-1215. (Year: 2019).*
Pujolle et al., Secure Session Management with Cookies, Dec. 10, 2009, IEEE, pp. 1-6. (Year: 2009).*
Gartner, Inc., "Secure Web Gateway", Gartner Glossary, available online at <https://web.archive.org/web/20230506022853/https://www.gartner.com/en/information-technology/glossary/secure-web-gateway>, May 6, 2023, 4 pages.
Wikipedia, "Internet filter", available online at <https://en.wikipedia.org/w/index.php?title=Internet_filter&oldid=1162312963>, Jun. 28, 2023, 9 pages.

* cited by examiner

TECHNIQUES FOR MANAGING COOKIES THROUGH A SECURE WEB GATEWAY

TECHNICAL FIELD

The present disclosure relates generally to secure web gateways and specifically to managing cookies while using third party software as a service providers through a zero trust network environment.

BACKGROUND

Organizations are increasingly allowing users to work both physically within the organization, and outside of it. When outside of the organization, a user will connect to the organization's internal computer network, private cloud network, hybrid, and the like, in order to access resources stored thereon. Often, users will use their own devices in a bring your own device (BYOD) setup. All this leads to security vulnerabilities which can leave the organization exposed. For example, users may download content from the secure network of an organization to a device that is exposed to a public network, thereby jeopardizing potentially sensitive information.

One of the solutions to combat to limit such expose is by deploying a secure web gateway (SWG). The SWG is configured to connect a user device to a network resource, and additionally perform filtering of content, inspection of content, and apply security controls to network traffic. SWG solutions generate a dedicated network space and connect the user device and, for example, web application which the user device is attempting to access, to the dedicated network space. Therefore, in order to utilize a SWG solution, network resources must be preconfigured in the network space. Furthermore, SWG solutions which are designed as standalone applications often do not easily integrate into an organization's workflow, log monitoring, reporting, and the like.

Furthermore, web applications often store cookies on a user device, for example in order to bypass a constant need to authenticate the user device. However, such cookies may continue to provide access to the web applications until they expire, which can lead to access which is not authorized if for some reason an organization wishes to revoke a user's access.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include receiving network traffic from a user device including an altered authentication cookie, the network traffic directed at a web application. Method may also include retrieving an original authentication cookie based on the altered authentication cookie. Method may furthermore include generating a new network traffic based on: the received network traffic, and the original authentication cookie. Method may in addition include sending the new network traffic from the zero trust network environment to the web application. Other embodiments of this aspect include corresponding computer systems, apparatus, and computer programs recorded on one or more computer storage devices, each configured to perform the actions of the methods.

Implementations may include one or more of the following features. Method may include: removing the altered authentication cookie from the received network traffic. Method may include: receiving an original authentication cookie in a network communication directed to the client device; removing the original authentication cookie from the network communication; and generating an altered network communication based on the received network communication and an altered authentication cookie. Method may include: sending the generated altered network communication to the client device. Method may include: determining, based on the altered authentication cookie, that the network traffic is not allowable; and terminating the network traffic. Method may include: altering the network traffic to direct a response from the web application to the zero trust network environment. Method may include: encrypting the original authentication cookie to generate an encrypted authentication cookie, where the altered authentication cookie is the encrypted authentication cookie. Method may include: decrypting the encrypted authentication cookie prior to sending the new network traffic to the web application. Method may include: encrypting the original authentication cookie based on any one of: an encryption key, a user credential, an identifier of the original authentication cookie, an identifier of the web application, and any combination thereof. Implementations of the described techniques may include hardware, a method or process, or a computer tangible medium.

In one general aspect, non-transitory computer-readable medium may include one or more instructions that, when executed by one or more processors of a device, cause the device to: receive network traffic from a user device including an altered authentication cookie, the network traffic directed at a web application. Medium may furthermore retrieve an original authentication cookie based on the altered authentication cookie. Medium may in addition generate a new network traffic based on: the received network traffic, and the original authentication cookie. Medium may moreover send the new network traffic from the zero trust network environment to the web application. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: receive network traffic from a user device including an altered authentication cookie, the network traffic directed at a web application. System may in addition retrieve an original authentication cookie based on the altered authentication cookie. System may moreover generate a new network traffic based on: the received network traffic, and the original authentication cookie. System may also send the new network traffic from the zero trust network environment to the web application. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: remove the altered authentication cookie from the received network traffic. System where the memory contains further instructions which when executed by the processing circuitry further configure the system to: receive an original authentication cookie in a network communication directed to the client device; remove the original authentication cookie from the network communication; and generate an altered network communication based on the received network communication and an altered authentication cookie. System where the memory contains further instructions which when executed by the processing circuitry further configure the system to: send the generated altered network communication to the client device. System where the memory contains further instructions which when executed by the processing circuitry further configure the system to: determine, based on the altered authentication cookie, that the network traffic is not allowable; and terminate the network traffic. System where the memory contains further instructions which when executed by the processing circuitry further configure the system to: alter the network traffic to direct a response from the web application to the zero trust network environment. System where the memory contains further instructions which when executed by the processing circuitry further configure the system to: encrypt the original authentication cookie to generate an encrypted authentication cookie, where the altered authentication cookie is the encrypted authentication cookie. System where the memory contains further instructions which when executed by the processing circuitry further configure the system to: decrypt the encrypted authentication cookie prior to sending the new network traffic to the web application. System where the memory contains further instructions which when executed by the processing circuitry further configure the system to: encrypt the original authentication cookie based on any one of: an encryption key, a user credential, an identifier of the original authentication cookie, an identifier of the web application, and any combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
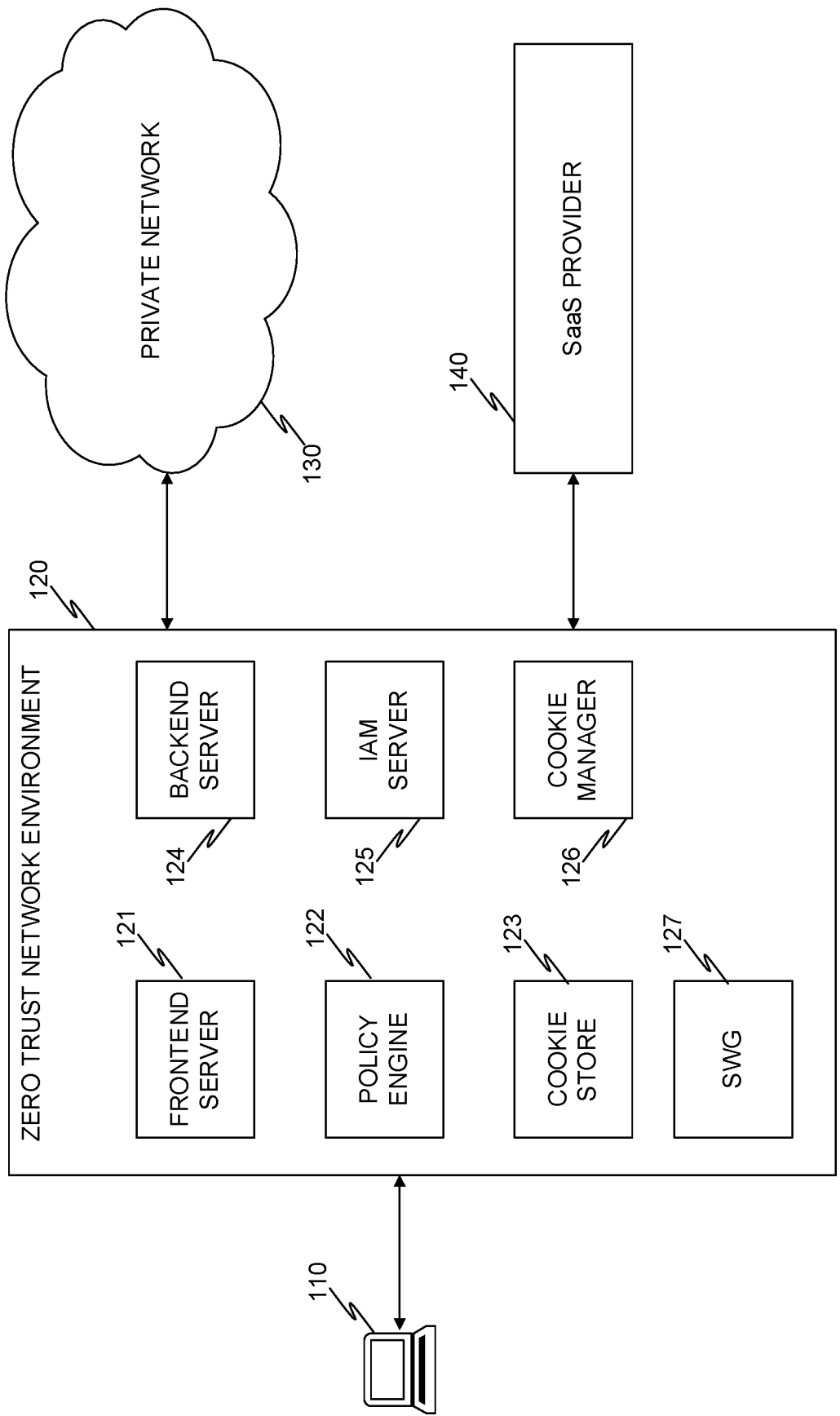
FIG. 1 is an example of a network diagram of a client device communicating through a zero trust network providing a secure web gateway, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing a secure web gateway (SWG) over a zero trust network environment. The system configures a client device operated by a user to install an agent on the client device. The agent, when executed on the client device, configures the client device to generate a virtual network interface (VNI). The agent further configures the client device to communicate through the VNI with a zero trust network environment. When the client device requests a network resource, which may be any network resource type, the agent configures the VNI to expose the network resource to the client device as a resource which is accessible through the local network of the VNI. The VNI exposes the client device to a virtual local network, in which various external network resources may be represented as though they are local resources in the virtual local network. Utilizing this method, all communication from the user device is always passed through the zero trust network, allowing a user device to connect to both a secure network, and authorized public network access. By not requiring a virtual private network (VPN) to connect a user device and a web application, resources which are outside of the VPN can also be exposed to the user device.

Furthermore, as the user device is only able to communicate through the VNI and the zero trust network environment, the zero trust network environment may continuously monitor all network traffic originating from and destined to the user device. This allows, for example, to intercept third party cookies, replacing them with alternate cookies, encrypted cookies, and the like, thus ensuring that even if the user device were able to communicate with a third party service, the third party service would not recognize the alternate cookie provided by the zero trust network to the user device, thereby blocking access from the user device to the third party service.

FIG. 1 is an example of a network diagram of a client device communicating through a zero trust network providing a secure web gateway, utilized to describe an embodiment. A user device 110 is communicatively connected to a zero trust network environment 120. The user device 110 may be, for example, a personal computer device, a laptop, a tablet, and the like. In an embodiment, the zero trust network (ZTN) environment 120 is implemented as a virtual private cloud (VPC) on a cloud computing environment. A cloud computing environment may be, for example, Amazon® Web Services (AWS), Microsoft® Azure, Google® Cloud Platform (GCP), and the like.

The ZTN environment 120 is connected to a private network 130, and a software as a service (SaaS) provider 140. The user of the user device 110 and the private network 130 belong to the same organization, in this example. In other embodiments, the user (i.e., user account) is otherwise permitted to access the private network 130. In an embodiment, the private network 130 may be implemented as a VPC on a public cloud, such as AWS, accessible over a public network. While a SaaS provider 140 is discussed in this example, the teachings herein apply equally to any web application which provides a cookie to a user device for purposes of authentication. Such a cookie is known as an authentication cookie. Authentication cookies attempt to enhance user experience when interacting with a SaaS application. Without authentication cookies, a user would be required to authenticate their credentials every time a new web page was accessed, or possibly even interacted with.

An authentication cookie is used in order to keep a user logged in. However, this presents a security challenge, since an organization using a third party SaaS may not desire to allow users to access the SaaS application outside of work hours, may desire to have users authenticate themselves with the SaaS provider more often than is set by default by the SaaS provider, or for any other reason wish to revoke access of a user from the SaaS application. As long as the user is in possession of an unexpired authentication cookie, they may continue to use the SaaS application. A SaaS provider 140 may be, for example, an email service, a CRM, a web-based ERP, and the like.

In an embodiment the private network 130 is limited in access only to authorized users, providing credentials which may be authenticated, for example through the zero trust network environment 120.

In certain embodiments, a connector application may be deployed in the private network 130 to facilitate communication between resources of the private network 130, and a backend server 124 of the zero trust network environment 120. A resource of the private network 130 may be, for example, an RDP server, an SSH server, a file server, an object database, a transactional database, a SQL database, a NoSQL database, a web server, a data repository, a web application, and the like.

The client device 110 further includes a network interface (not shown). The network interface allows the client device 110 to communicate with, for example, the zero trust network (ZTN) 120. In an embodiment, the client device 110 receives an agent software from the ZTN 120. The agent software includes instructions which when executed by a processing circuitry of the client device 110 configure the client device 110 to realize a virtual network interface (VNI). The instructions, when executed, may further configure the client device 110 to communicate exclusively through the VNI. In an embodiment the VNI includes a routing table based on a network namespace. In some embodiments, the network namespace is an isolated network namespace. In certain embodiments, the agent software may exclusively update the routing table to expose various resources.

For example, the agent software may update the routing table to indicate that a resource (e.g., a webserver) has an IP address 10.0.0.115. In practice, the resource has a different address which is on a local private network. When the client device 110 generates a packet directed at that address, the VNI allows it to pass and sends the packet to the ZTN 120 for resolving. In an embodiment, the packet may be altered to include an IP address of the ZTN 120, an IP address of the resource (i.e., the different address), and the like. For the client device 110, the resource is therefore seen as a resource accessible on a local network, while in practice it is only accessible through the ZTN 120. Using this technique, any resource can be mapped through the VNI to be exposed to the client device 110. Resources from public networks, from private networks, and both, can be exposed using this technique. This is advantageous, as it provides additional functionality and access to the client device 110.

The zero trust network (ZTN) 120 includes workloads, such as a frontend server 121, a policy engine 122, a cookie store 123, a backend server 124, an identity and access management (IAM) server 125, a cookie manager 126, and a secure web gateway (SWG) 127. In an embodiment, the workloads may each be implemented: on a bare metal machine, as a virtual machine, as a container, as a serverless function, and as any combination thereof.

A user device 110 connecting to the ZTN 120 may be directed to the frontend server 121. The frontend server 121 is configured to receive communication from a user device, such as user device 110, send communication to the user device 110, and communicate with other components of the ZTN 120, such as the backend server 124, the SWG 127, the policy engine 122, the cookie manager 126, and the IAM server 125.

In an embodiment, the frontend server 121 is configured to generate a request for credentials of a user account. Credentials may include, for example, a username, password, cryptographic key, secret, one time passcode (OTP), biometric information, and the like. In an embodiment, the credentials are supplied to an IAM server 125. The IAM server 125 may authenticate the credentials. In an embodiment, the IAM server 125 may issue a multi-factor authentication (MFA) challenge. The challenge may include a request to receive additional credentials, for example, by sending a unique PIN, a temporary PIN, and the like, to a predetermined mobile phone number associated with a user account supplying the credentials from the user device.

In certain embodiments, the frontend server 121 is configured to provide to a user device, in response to successfully authenticating credentials provided by the user device, an agent software. The agent software, when executed by a processing unit of the user device, may configure the user device to perform the methods described in more detail herein.

A backend server 124 is configured to connect to a private network, for example via a connector application which is deployed in the private network. The private network is a network which is external to the ZTN 120, and is not a public network. The backend server 330 may be configured to communicate with the frontend server 121 in order to establish a communication line between a client device 110, to the frontend server 121, to the backend server 124, to a resource (not shown) in a private network.

A secure web gateway (SWG) 127 is configured to perform actions on network traffic received from a user device. Actions may include, for example, filtering uniform resource locators (URLs), content inspection, policy enforcement, malicious code detection, and providing application controls for web-based applications, such as instant messaging applications. In an embodiment, the SWG 127 may be configured to receive incoming network traffic, e.g., IP packets, from the frontend server 121. The incoming network traffic may be filtered, for example based on a policy retrieved from a policy engine 122. The policy engine 122 is configured to store thereon policies relating to user accounts, IP addresses, domain catalogs, and the like. In certain embodiments, the SWG 127 is further configured to initiate inspection of network traffic, for example by providing an IP packet to a deep packet inspection (DPI) unit. The DPI unit is configured to inspect network traffic content, for example by performing signature matching to detect network attacks, block certain protocols, and the like.

In some embodiments, the SWG 127 may determine when to provide network traffic to the DPI unit, for example based on a policy retrieved from the policy engine 122. This may be beneficial as performing a DPI on every packet may lead to network congestion due to a bottleneck on the DPI unit. The SWG 127 may be configured to read only a header of a packet, and determine if the packet should be provided to the DPI unit, based on the header information and a policy retrieved from the policy engine 122.

In certain embodiments, the SWG 127 may detect an authentication cookie in a response from a web application, such as the SaaS provider 140. The detected authentication cookie is provided to the cookie manager 126. In an embodiment, the cookie manager 126 encrypts the cookie and sends the encrypted cookie to the user device 110. The user device is thus unable to communicate directly (i.e., not through the ZTN 120) with the SaaS provider 140 as the user device 110 cannot decrypt the encrypted cookie.

In other embodiments, the cookie manager 126 may store the received authentication cookie (i.e., original cookie) in a cookie store 123, generate an alternate cookie, and provide the alternate cookie to the client device 110. If the user device 110 attempted to communicate with the SaaS provider 140 with the alternate cookie, the SaaS provider 140 would not authenticate the user device 110 as the alternate cookie was not issued by the SaaS provider 140. Thus, the only way for the client device to access the SaaS application is through the zero trust network environment 120.

Figure 2:
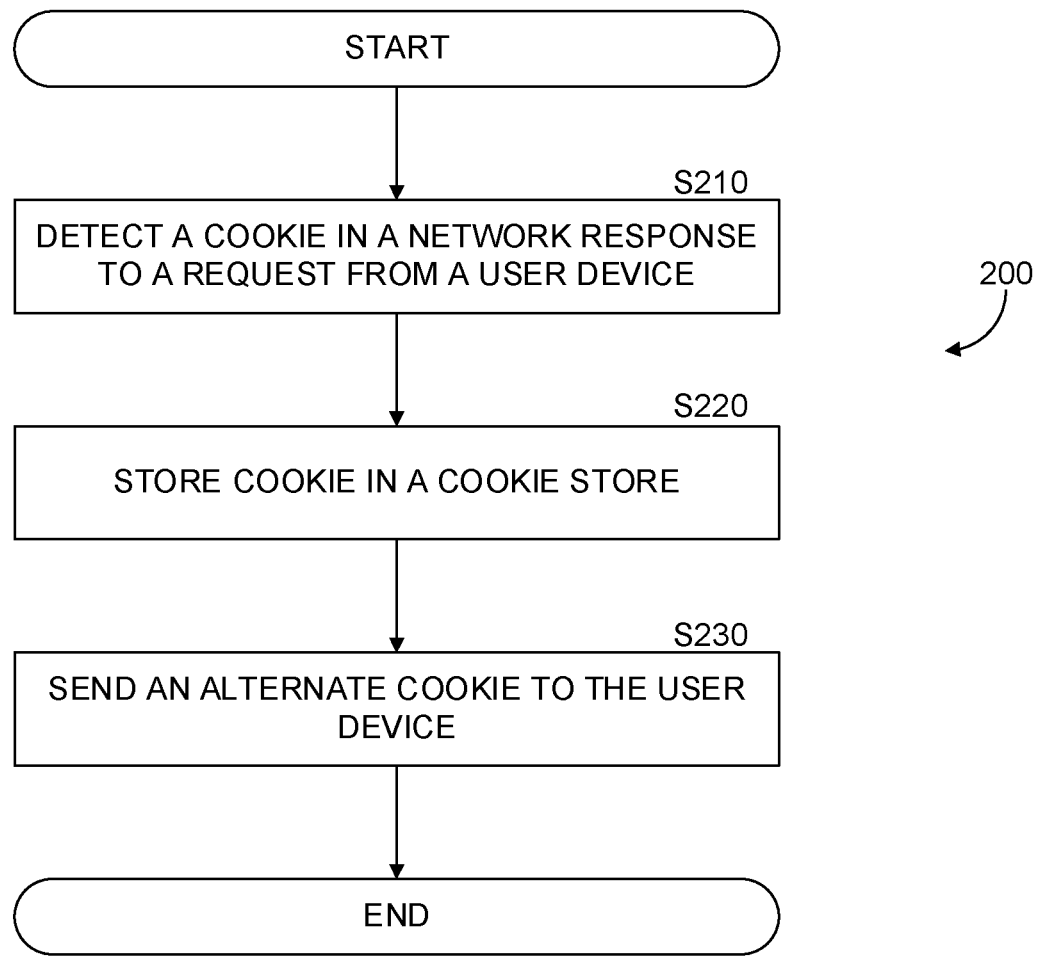
FIG. 2 is an example flowchart of a method for providing an alternate cookie to a user device accessing a SaaS provider through a zero trust network environment providing a secure web gateway, implemented in accordance with an embodiment.

FIG. 2 is an example flowchart 200 of a method for providing an alternate cookie to a user device accessing a SaaS provider through a zero trust network environment providing a secure web gateway, implemented in accordance with an embodiment.

At S210, an authentication cookie is detected. In an embodiment, the authentication cookie is detected in a response from a web application, SaaS provider, and the like generated based on a request from a user device. The authentication cookie is used to authenticate a user account associated with the user device, wherein the user account may access the web application.

In an embodiment, the authentication cookie is detected in network traffic between a client device configured with a VNI to communicate with an external resource, such as a SaaS provider, through a zero trust network environment.

At S220, the authentication cookie is stored in a cookie store. In certain embodiments, the authentication cookie may be stored with additional data, metadata, information, and the like. For example, the authentication cookie may be stored with an identifier of the user device, an identifier of the user account, an identifier of a corresponding alternate cookie, a timestamp, and the like. In certain embodiments, an authentication cookie is stored for a predetermined period of time. Periodically, a cookie manager may purge cookies which are stored in a cookie store for longer than an associated predetermined period of time.

At S230, an alternate cookie is sent to the user device. In an embodiment, sending the alternate cookie to the user device includes receiving an HTML message from a web application, removing an authentication cookie therefrom, replacing the authentication cookie with the alternate cookie, and providing the user device with the HTML message containing the alternate cookie. In some embodiments, the alternate cookie is generated by a cookie manager. The alternate cookie may be generated based on received user credentials, an identifier of the original authentication cookie, an identifier of the web application, and the like.

Figure 3:
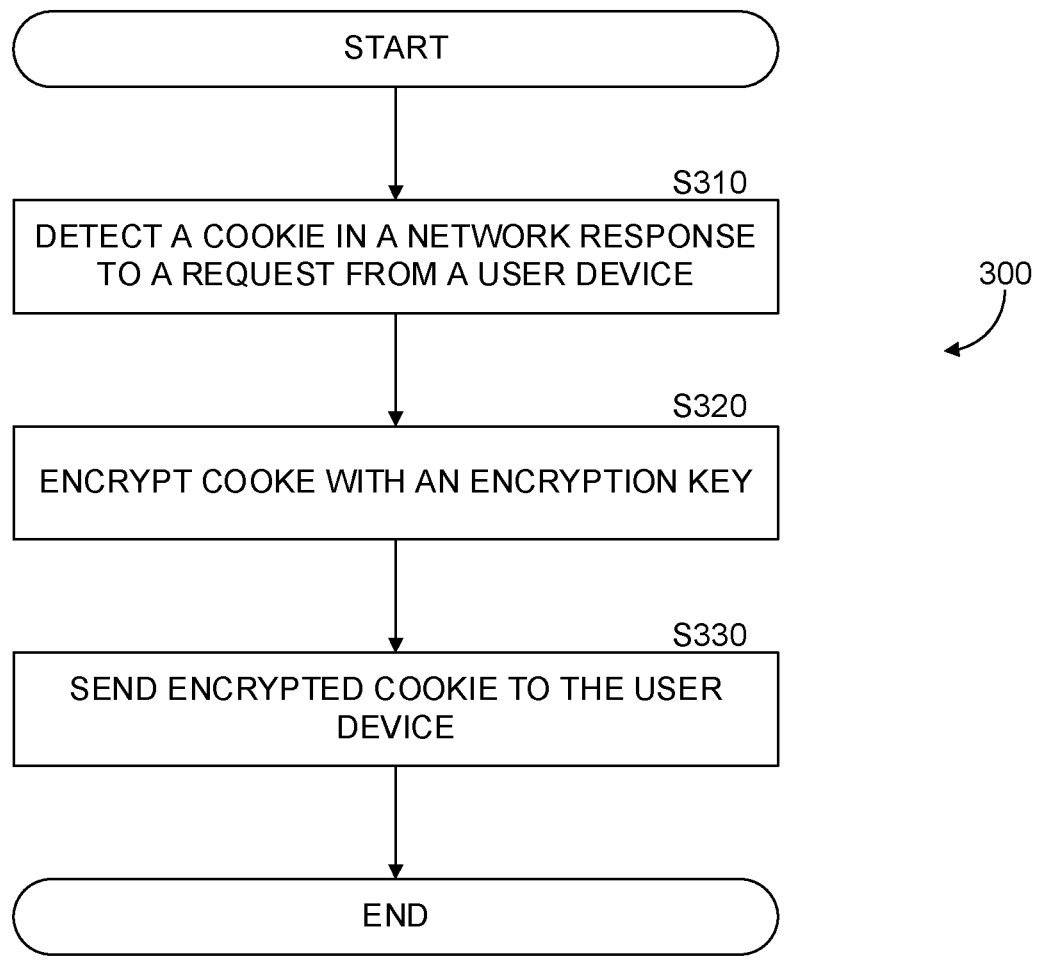
FIG. 3 is an example of a flowchart of a method for providing an encrypted cookie to a user device accessing a SaaS provider through a zero trust network environment providing a secure web gateway, implemented in accordance with an embodiment.

FIG. 3 is an example of a flowchart 300 of a method for providing an encrypted cookie to a user device accessing a SaaS provider through a zero trust network environment providing a secure web gateway, implemented in accordance with an embodiment. In certain embodiments, in order to avoid storing authentication cookies in the zero trust network environment, an alternative is to encrypt the authentication cookie, and store the encrypted authentication cookie on the user device. Without a capability to decrypt the cookie, the user device is not able to access the SaaS provider. Thus, the user device must communicate with the SaaS provider through the zero trust network environment, so that, in an embodiment, the encrypted cookie can be decrypted by the cookie manager.

At S310, an authentication cookie is detected. In an embodiment, the authentication cookie is detected in a response from a web application, SaaS provider, and the like generated based on a request from a user device. The authentication cookie is used to authenticate a user account associated with the user device, wherein the user account may access the web application.

At S320, the authentication cookie is encrypted with an encryption key. In an embodiment an encryption key is generated for each user, for each combination of user and web application, for each web application, and the like. In other embodiments, a single encryption key is used to encrypt all authentication cookies. In some embodiments, the encryption key may be stored in a key vault in a cloud based computing environment, such as Azure key vault.

At S330, the encrypted cookie is sent to the user device. In an embodiment, sending the encrypted cookie to the user device includes receiving an HTML message from a web application, removing an authentication cookie therefrom, encrypting the authentication cookie, replacing the authentication cookie with the encrypted cookie, and providing the user device with the HTML message containing the encrypted cookie. In some embodiments, the encrypted cookie is generated by a cookie manager. The encrypted cookie may be generated based on an encryption key, received user credentials, an identifier of the original authentication cookie, an identifier of the web application, a combination thereof, and the like.

Figure 4:
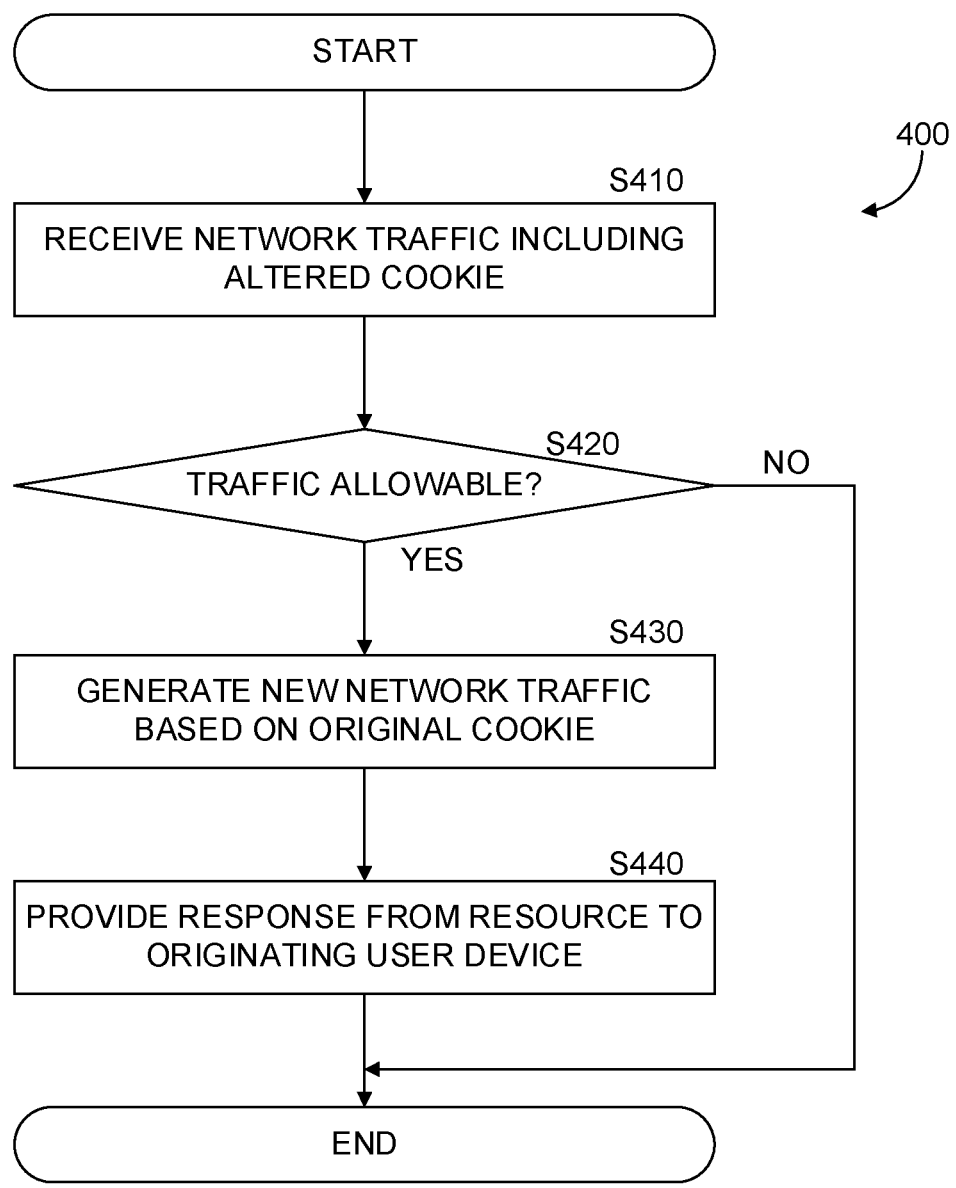
FIG. 4 is an example of a flowchart of a method for facilitating communication between a user device and a SaaS provider through a zero trust network providing a secure web gateway using authentication cookies, implemented in accordance with an embodiment.

FIG. 4 is an example of a flowchart 400 of a method for facilitating communication between a user device and a SaaS provider through a zero trust network providing a secure web gateway using authentication cookies, implemented in accordance with an embodiment.

At S410, network traffic is received including an altered cookie. An altered cookie is a stand-in for an authentication cookie, provided by a zero trust network environment. An altered cookie may be, for example, an alternate cookie as described in FIG. 2 above, an encrypted cookie as described in FIG. 3 above, and the like. The network traffic may include, for example, an HTML request, a URL, and the like.

At S420 a check is performed to determine if the network traffic is allowable. In an embodiment, a policy engine may provide a policy which when applied to the network traffic determines if the network traffic is allowable or not (i.e., blocked). The policy may be based, for example, on an age of the altered cookie, on a user account identifier, on a user device identifier, on an IP address associated with the user device, and the like. If the network traffic is allowable execution continues at S430. If the network traffic is not allowable, execution may terminate. In an embodiment, the network traffic is terminated, for example by not sending the network traffic.

At S430, new network traffic is generated. The new network traffic is generated based on the received network traffic, by removing the altered cookie and replacing it with the original authentication cookie. In an embodiment, an alternate cookie may be replaced with the original authentication cookie by looking up for the alternate cookie where the original authentication cookie was stored. In another embodiment, an encrypted cookie may be decrypted, where the decrypted cookie is the original authentication cookie. In certain embodiments, the new network traffic may be further generated so that the SaaS provider, when generating a response to a request in the network traffic, is configured to send the response to the zero trust network rather than to the client device. Thus the communication session remains monitored by the SWG of the zero trust network, resulting in a secure network session.

At S440, a response from the SaaS provider is sent. In an embodiment, the response is sent to the user device. The user device performs the communication with the zero trust network resulting in a secure network session, where the zero trust network is able to authenticate the user device with the SaaS provider. As the user device is unable to authenticate with the SaaS provider without the zero trust network, there is no risk of unauthorized access to the SaaS provider.

Figure 5:
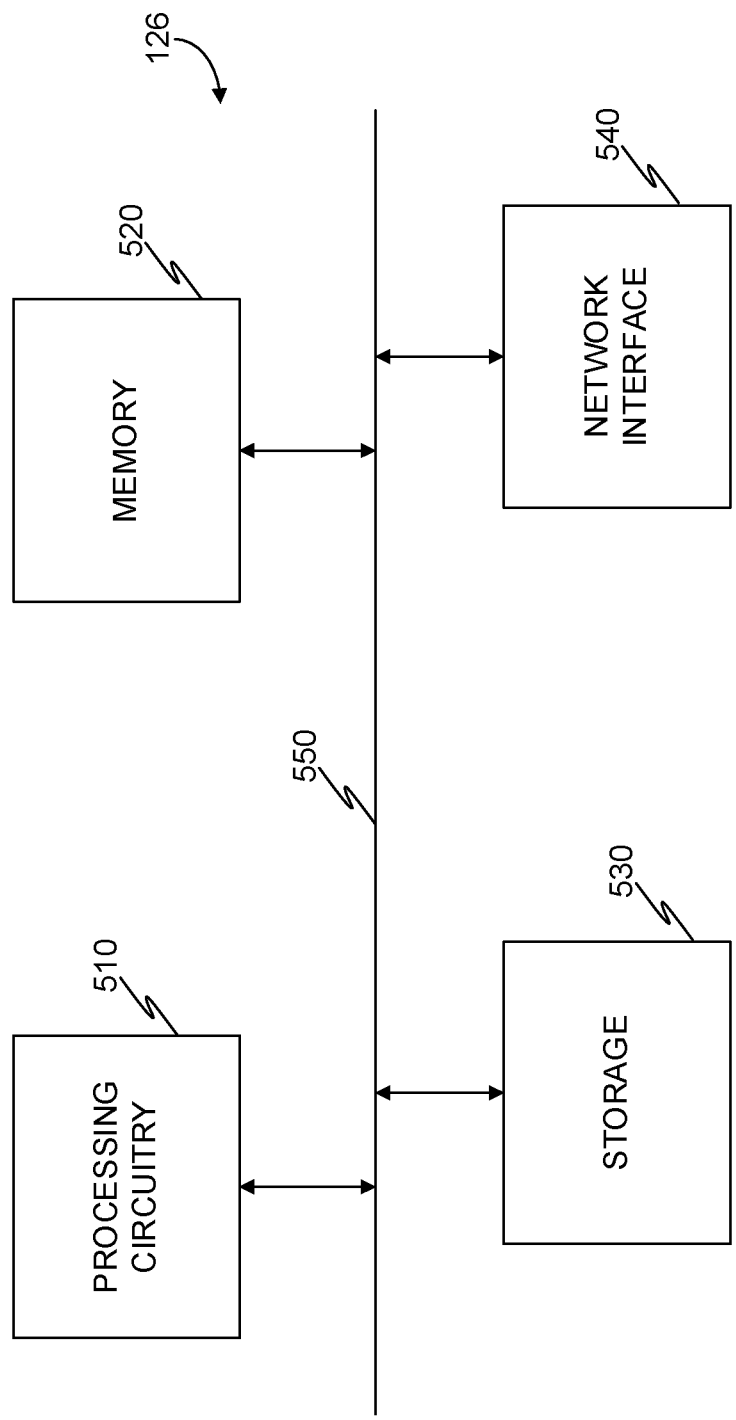
FIG. 5 is an example schematic diagram of a cookie manager according to an embodiment.

FIG. 5 is an example schematic diagram of a cookie manager 126 according to an embodiment. The cookie manager 126 includes a processing circuitry 510 coupled to a memory 520, a storage 530, and a network interface 540. In an embodiment, the components of the cookie manager 126 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the cookie manager 126 to communicate with, for example, the frontend server 121, the policy engine 122, the SWG 127, the cookie store 123, and the like.

It should be understood that the embodiments described herein are not limited to the specific architecture illustrated in FIG. 5, and other architectures may be equally used without departing from the scope of the disclosed embodiments.

Furthermore, the frontend server, the backend server, the DPI unit, the policy engine, and the like, may be implemented using an architecture similar to the one described in FIG. 5 without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for facilitating communication between a user device and a web application through a zero trust network providing a secure web gateway using authentication cookies, comprising:
   receiving an original authentication cookie in a network communication directed to the user device;
   removing the original authentication cookie from the network communication;
   generating an altered network communication based on the received network communication and an altered authentication cookie;
   receiving network traffic from the user device including the altered authentication cookie, the network traffic directed at a web application;
   retrieving the original authentication cookie based on the altered authentication cookie;
   generating a new network traffic based on: the received network traffic, and the original authentication cookie; and
   sending the new network traffic from the zero trust network environment to the web application.

2. The method of claim 1, further comprising:
   removing the altered authentication cookie from the received network traffic.

3. The method of claim 1, further comprising:
   sending the generated altered network communication to the user device.

4. The method of claim 1, further comprising:
   determining, based on the altered authentication cookie, that the network traffic is not allowable; and
   terminating the network traffic.

5. The method of claim 1, further comprising:
   altering the network traffic to direct a response from the web application to the zero trust network environment.

6. The method of claim 1, further comprising:
   encrypting the original authentication cookie to generate an encrypted authentication cookie, wherein the altered authentication cookie is the encrypted authentication cookie.

7. The method of claim 6, further comprising:
   decrypting the encrypted authentication cookie prior to sending the new network traffic to the web application.

8. The method of claim 6, further comprising:
   encrypting the original authentication cookie based on any one of: an encryption key, a user credential, an identifier of the original authentication cookie, an identifier of the web application, and any combination thereof.

9. A non-transitory computer-readable medium storing a set of instructions for facilitating communication between a user device and a web application through a zero trust network providing a secure web gateway using authentication cookies, the set of instructions comprising:
   one or more instructions that, when executed by one or more processors of a device, cause the device to:
   receive an original authentication cookie in a network communication directed to the user device;
   remove the original authentication cookie from the network communication;
      generate an altered network communication based on the received network communication and an altered authentication cookie;
      receive network traffic from the user device including the altered authentication cookie, the network traffic directed at a web application;
      retrieve the original authentication cookie based on the altered authentication cookie;
      generate a new network traffic based on: the received network traffic, and the original authentication cookie; and
      send the new network traffic from the zero trust network environment to the web application.

10. A system for facilitating communication between a user device and a web application through a zero trust network providing a secure web gateway using authentication cookies comprising:
   a processing circuitry; and
   a memory, the memory containing instructions that, when executed by the processing circuitry, configure the system to:
   receive an original authentication cookie in a network communication directed to the user device;
   remove the original authentication cookie from the network communication;
   generate an altered network communication based on the received network communication and an altered authentication cookie;
      receive network traffic from the user device including the altered authentication cookie, the network traffic directed at a web application;
      retrieve the original authentication cookie based on the altered authentication cookie;
      generate a new network traffic based on: the received network traffic, and the original authentication cookie; and
      send the new network traffic from the zero trust network environment to the web application.

11. The system of claim 10, wherein the memory contains further instructions which when executed by the processing circuitry further configure the system to:
   remove the altered authentication cookie from the received network traffic.

12. The system of claim 10, wherein the memory contains further instructions which when executed by the processing circuitry further configure the system to:
   send the generated altered network communication to the user device.

13. The system of claim 10, wherein the memory contains further instructions which when executed by the processing circuitry further configure the system to:

determine, based on the altered authentication cookie, that the network traffic is not allowable; and terminate the network traffic.

14. The system of claim 10, wherein the memory contains further instructions which when executed by the processing circuitry further configure the system to:

alter the network traffic to direct a response from the web application to the zero trust network environment.

15. The system of claim 10, wherein the memory contains further instructions which when executed by the processing circuitry further configure the system to:

encrypt the original authentication cookie to generate an encrypted authentication cookie, wherein the altered authentication cookie is the encrypted authentication cookie.

16. The system of claim 15, wherein the memory contains further instructions which when executed by the processing circuitry further configure the system to:

decrypt the encrypted authentication cookie prior to sending the new network traffic to the web application.

17. The system of claim 15, wherein the memory contains further instructions which when executed by the processing circuitry further configure the system to:

encrypt the original authentication cookie based on any one of: an encryption key, a user credential, an identifier of the original authentication cookie, an identifier of the web application, and any combination thereof.

* * * * *